United States Patent [19]

Kleine et al.

[11] 4,210,127
[45] Jul. 1, 1980

[54] HEAT EXCHANGER PANEL HAVING REFERENCE INDICIA AND IMPROVED FLOW DISTRIBUTION

[75] Inventors: Charles A. Kleine, Florissant, Mo.; Verne L. Middleton, East Alton, Ill.

[73] Assignee: Olin Corporation, New Haven, Conn.

[21] Appl. No.: 917,815

[22] Filed: Jun. 22, 1978

[51] Int. Cl.² ............................................. F24J 3/02
[52] U.S. Cl. ................................. 126/444; 126/448; 165/170
[58] Field of Search ................ 126/444, 448; 165/170

[56] References Cited

U.S. PATENT DOCUMENTS

| 4,021,901 | 5/1977 | Kleine et al. | 165/170 |
| 4,093,024 | 6/1978 | Middleton | 126/444 |

FOREIGN PATENT DOCUMENTS

| 1170002 | 2/1954 | France | 165/170 |
| 1097233 | 2/1955 | France | 165/170 |

*Primary Examiner*—Carroll B. Dority, Jr.
*Attorney, Agent, or Firm*—Paul Weinstein; Victor A. DiPalma

[57] ABSTRACT

A heat exchanger panel having a desired system of tubular passageways having a heat exchange medium wherein said panel includes opposed headers including island-like bonded portions and said passageways have entry and exit portions extending from said headers to provide ingress and egress openings for said heat exchange medium. The headers include as part of the island-like bonded portions alphanumeric bonded portions to assist in properly installing the panel within a complete solar collector assembly.

12 Claims, 10 Drawing Figures

HEAT EXCHANGER PANEL HAVING REFERENCE INDICIA AND IMPROVED FLOW DISTRIBUTION

BACKGROUND OF THE INVENTION

The present invention relates to metal panels having a system of internal tubular passageways disposed between spaced apart portions of the thickness of the panel. Said panels possess utility in heat exchange applications wherein a heat exchange medium is circulated through said passageways. A particularly application of said panels resides in devices utilizing solar energy, and specifically, solar energy absorbing devices for elevating fluid temperature.

It is well known that the radiation of the sun can be collected as a source of energy for heating or cooling or for direct conversion to electricity. Heating and cooling depend upon collection of rays of solar energy in a fluid heating transfer system. The heated fluid is pumped or allowed to flow to a place of utilization for the thermal energy it has acquired.

In certain areas of the world, solar energy is the most abundant form of available energy if it could be harnessed economically. Even in more developed areas of the world, the economic harnessing of solar energy would provide an attractive alternative to the use of fossil fuels for energy generation.

One of the problems attending the development of an efficient system for the conversion of solar energy resides with the structure and design of the solar energy absorbing device, or solar collector. This solar collector generally comprises a rectangular plate-like structure possessing channels or passageways for the circulation of the energy absorbing fluid medium. Conventionally; these panels have comprised a pair of opposed expanded passageways, known as headers, which are placed at opposite ends of the panel, and are connected by a plurality of tubular passageways which are often in parallel relation with respect to each other. These passageways, as well as the headers themselves, have generally been disposed at right angles with respect to each other and in parallel relation with respect to the horizontal and vertical dimensions, respectively, of the panel.

The aforementioned configuration suffers from certain deficiencies, in that fluid flow tends to encounter pockets of stagnation which cut down on the efficient circulation of solar energy. Further, as a partial result of the turbulent operating conditions attending heat exchange applications, various entrained gases tend to collect in the passageways, with the result that air locks which greatly inhibit flow and reduce the maximum fluid circulation capacity of the panel are often formed.
p In addition, various problems have been encountered in the placement of such panels since it has not been known from the panel itself which end to place in a certain manner during connection of these panels to a heat exchanger system. Furthermore, the tubular passageways utilized in earlier heat exchanger panels have not completely taken into account the heat radiation caused by the edge portion of said panel adjacent to said tubular passageways. It has also been felt that an improvement in flow distribution throughout the panel can be accomplished not only by changing the header configuration but also by changing the configuration of the tubular passageways connecting the headers in the panel. To these ends, the improvements embodied in the present invention were therefore developed.

SUMMARY OF THE INVENTION

In accordance with the present invention, a heat exchanger is provided which possesses significantly improved efficiency, and specific utility in solar energy applications.

The panel of the present invention comprises a system of tubular passageways for a heat exchange medium defining opposed headers connected by connecting portions of said passageways extending therebetween, said passageways having entry and exit portions extending from said headers to provide ingress and egress openings for said heat exchange medium, wherein said headers include a fluid distributing pattern comprising numerous island-like bonded portions connected by a plurality of tubular channels passing therebetween to assist in the even distribution of flow of said heat exchange medium through said headers.

The panel of the present invention also provides for the inclusion, as part of the original pattern used to form the tubular passageways, of alphanumeric indicia which serve to both define the positioning of the panel when utilized as part of an entire heat exchanger system and which also act along with the island-like bonded areas to evenly distribute the flow of heat exchange medium throughout the header area of the panel.

The tubular passageways connecting the header portions in the panel of the present invention also utilize several innovations to help equalize both the fluid flow and the heat flow of heat exchange medium throughout the panel. In particular, the panel of the present invention utilizes a series of tubular passageways which vary in size depending on whether the tubular passageways are adjacent to the longitudinal edges of said panel or whether the tubular passageways are located in the central portion of said panel. These tubular passageways also utilize interconnecting portions between each passageway which further help to equalize the flow of both fluid and heat carried by the fluid throughout the panel.

As indicated above, the preferred embodiment of the present invention utilizes a metal panel having a system of internal fluid passageways, conventionally painted black, as will be described in more detail hereinbelow. The concepts of the present invention may, however, also be advantageously utilized in heat exchangers generally, such as, for example, using extrusions. Since the concepts of the present invention are particularly advantageous in metal panels having a system of internal fluid passageways, the present invention will be specifically described hereinbelow utilizing this type of system.

Accordingly, it is a principal object of the present invention to provide a metal panel for use in heat exchange applications which enables the efficient and economical transfer of heat energy.

It is another object of the present invention to provide a metal panel as aforesaid which readily indicates the proper installation direction of said panel when utilized as part of an entire heat exchange system.

It is a further object of the present invention to provide a metal panel as aforesaid which is particularly suited for use in a solar energy collector system.

It is yet a further object of the present invention to provide a metal panel as aforesaid which is efficiently designed to allow maximum utilization of internal passageway systems in a solar energy collector.

Further objects and advantages will become apparent to those skilled in the art as a detailed description proceeds with reference to the following drawings.

DETAILED DESCRIPTION

In accordance with the present invention, the foregoing objects and advantages are readily attained.

The panels of the present invention are provided with a flow distributing pattern in the headers comprising a part of the passageways thereof, wherein fluid flow is subdivided into discrete channels which are thereby capable of travel through said panel at higher rates of speed.

The present invention is directed to the problem of fluid blockage which results from the turbulent conditions under which the panels are operated. Specifically, the panels are conventionally situated in the vertical plane whereby the inlet opening is provided at the top edge thereof. Fluid enters at a rate accelerated by gravity and is then split into a plurality of channels to flow through the panel. A problem which has arisen in this arrangement is concerned with the turbulence of fluid movement through the inlet which results in a pressure drop as the fluid leaves the inlet and enters the expanded chamber of the header. This pressure drop causes air pockets to form and tends to impede the movement of fluid. To this end, the flow dividing pattern of the present invention provides the uniformity in volume and resistance to flow which prevents the development of the detrimental pressure differential.

Figure 1:
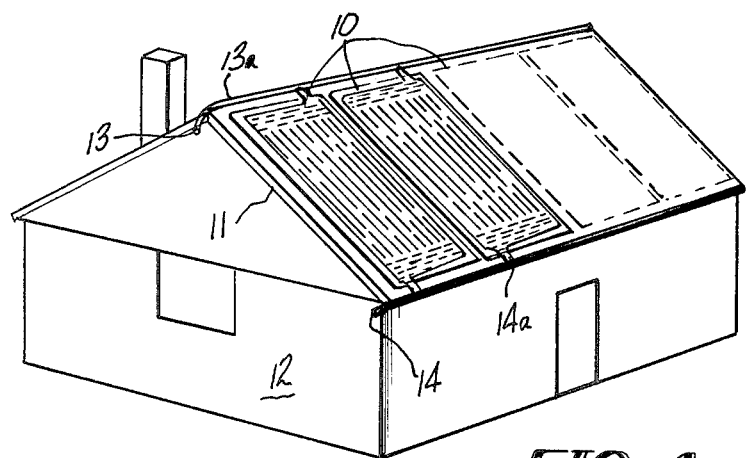
FIG. 1 is a diagram showing schematically the manner in which the panels of the present invention can be embodied.

The panels of the present invention are preferably utilized in a solar heating system as shown in FIG. 1 wherein a plurality of panels of the present invention 10 are mounted on roof 11 of building 12 with conduits 13 and 14 connected in any convenient fashion to the equipment in the building, with the connections not shown. Thus, for example, cold water may go into conduit 13 from the building 12 by means of a conventional pump or the like. The water flows along common manifold 13a and is distributed into panels 10. The water flows through panels 10, is heated by means of solar energy, is collected in common manifold 14a and flows into conduit 14. The heated water is then stored or utilized in a heat exchange system inside the building in a known manner. Naturally, if desired, the water flow may be reversed with the cold water entering via conduit 14 and collected via conduit 13. Alternatively, the solar heating unit of the present invention may be used or placed in any suitable environment, such as on the ground with suitable fasteners to prevent displacement by wind or gravity. The solar heating unit of the present invention may be used for residential heating purposes, such as in providing hot water in a residential environment. For example, three panels of the present invention having dimensions of 8 feet×4 feet would efficiently supply an average household of four with hot water for home use. Alternatively, the solar panels of the present invention may be conveniently used for heating water for swimming pools or for preheating water for domestic gas or oil fired domestic hot water heaters. The fluid is preferably retained in a closed system with the water in the system heated in the solar unit and delivered into an insulated cistern or container so that the heated fluid may be stored up during sunshine for use on cool cloudy days or at night when the heating of the fluid in the panel will not be of sufficient degree of provide the desired heat at the point of use.

A thermostat not shown is desirable installed at the top of the solar heater and this thermostat may be set to turn on a circulating pump whenever the temperature reaches a predetermined reading. The pump will then pump the water through the system as generally outlined above.

Figure 2:
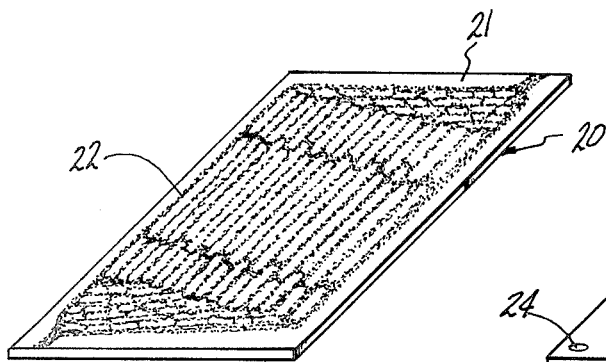
FIG. 2 is a perspective view of a sheet of metal having a pattern of weld-inhibiting material applied to a surface thereof.
Figure 3:
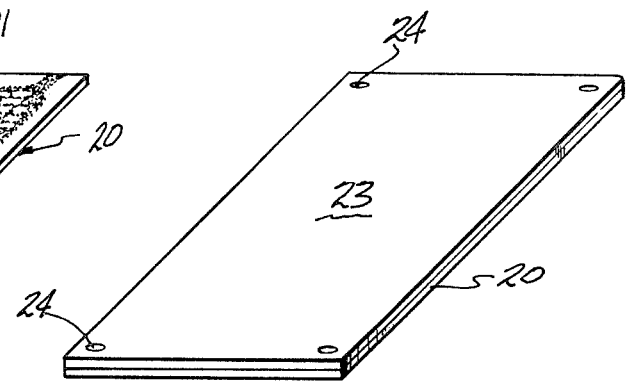
FIG. 3 is a perspective view of a composite metal blank wherein a second sheet of metal is superimposed on the sheet of metal shown in FIG. 2 with the pattern of weld-inhibiting material sandwiched therebetween.
Figure 4:
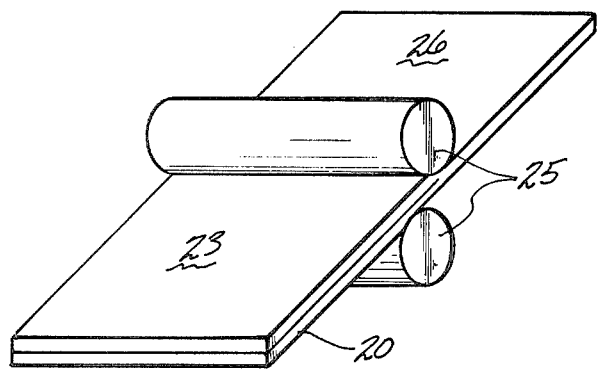
FIG. 4 is a schematic perspective view showing the sheets of FIG. 3 being welded together while passing through a pair of mill rolls.

As indicated above, the present invention contemplates a particularly preferred panel design for optimum efficiency in a solar heating system as described above. The metal panel or plate of the present invention is desirably fabricated by the ROLL-BOND ® process as shown in U.S. Pat. No. 2,690,002. FIG. 2 illustrates a single sheet of metal 20 as aluminum or copper or alloys thereof, having applied to a clean surface 21 thereof a pattern of weld-inhibiting material 22 corresponding to the ultimate desired passageway system. FIG. 3 shows the sheet 20 having superimposed thereon a second sheet 23 with a pattern of weld-inhibiting material 22 sandwiched between the unit. The units 20 and 23 are tacked together as by support welds 24 to prevent relative movement between the sheets as they are subsequently welded together as shown in FIG. 4 by passing through a pair of mill rolls 25 to form welded blank 26. It is normally necessary that the sheets 20 and 23 be heated prior to passing through the mill rolls to assure that they weld to each other in keeping with techniques well known in the rolling art.

Figure 5:
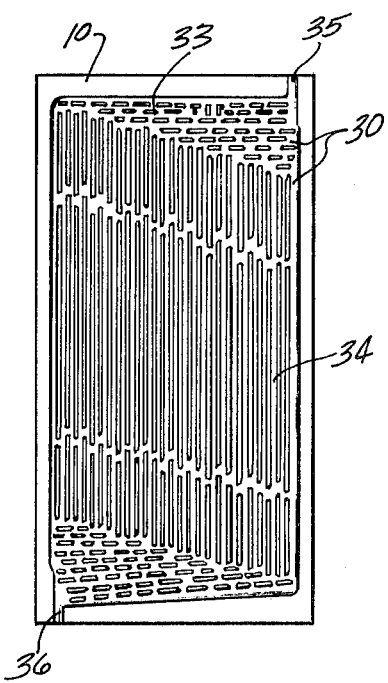
FIG. 5 is a top view showing the panel of the present invention having internal tubular passageways disposed between spaced apart portions of the thickness of the panel in the areas of the weld-inhibiting material.
Figure 6:
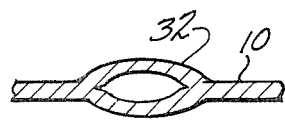
FIG. 6 is a sectional view of a respresentative tubular passageway in the panel of FIG. 5.
Figure 7:
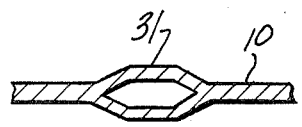
FIG. 7 is an alternate view showing a variation in the tube configuration similar to the view of FIG. 6

The resultant blank 26 is characterized by the sheets 20 and 23 being welded together except at the area of the weld-inhibiting material 22. The blank 26 with the unjoined inner portion corresponding to the pattern of weld-inhibiting material 22 may then be softened in any appropriate manner as by annealing, and thereafter the blank may be cold rolled to provide a more even thickness and again annealed. The portions of the panel adjacent the weld-inhibiting material 22 are then inflated by the introduction of fluid distending pressure, such as with air or water, in a manner known in the art to form a system of internal tubular passageways 30 corresponding to the pattern of weld-inhibiting material as shown in FIG. 5. The passageways 30 extend internally within panel 10 and are disposed between spaced apart portions of the thickness of said panel. Thus, panel 10 comprises a hollow sheet metal panel or plate having a system of fluid passageways 30 for a heat exchange medium extending internally therein. If the passageways are inflated by the introduction of fluid distending pressure between flat die platens, the resultant passageways have a flat topped configuration 31 as shown in FIG. 7. If, on the other hand, passageways 30 are formed without the presence of superimposed platens, the resultant passageway configuration has a semicircular shape 32 as shown in FIG. 6.

As shown in FIG. 5, the passageways 30 include opposed headers 33 connected by connecting portions 34 of said passageways extending substantially longitudinally in panel 10 between headers 33 and interconnecting same, with the opposed headers 33 extending in a direction substantially transverse to said longitudinal passageways. Preferably, opposed headers 33 are connected by a plurality of spaced, parallel individual connecting portions 34 of said passageways extending between the headers. Also passageways 30 include entry portion 35 and exit portion 36 extending from headers 33 to provide ingress and egress openings for the heat exchange medium.

Figure 8:
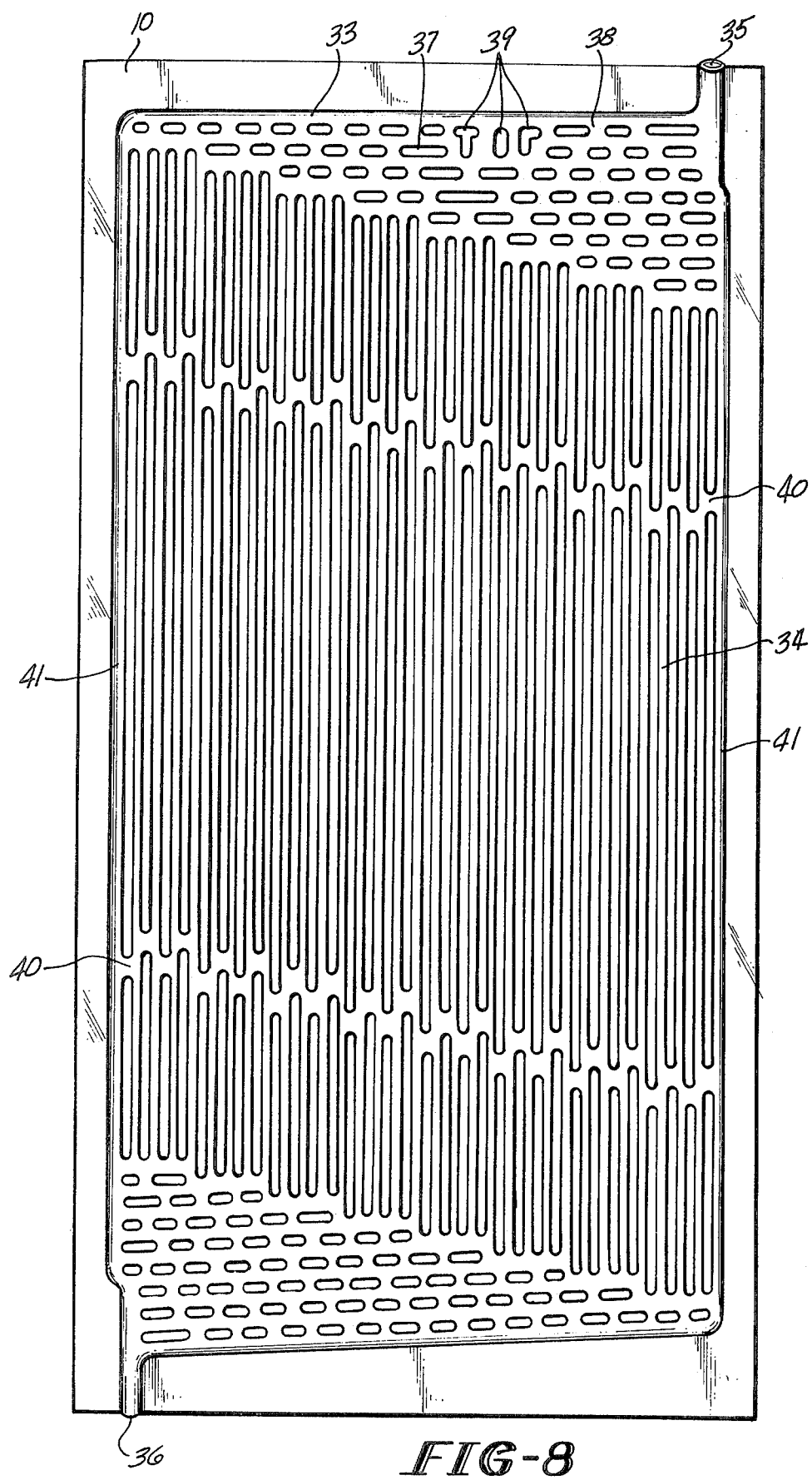
FIG. 8 is a perspective view of the panel of the present invention showing the indicia utilized in the present invention in their correct position.

In accordance with the present invention, as illustrated in FIG. 8, the headers 33 are provided with a fluid distributing pattern comprising bonded islandlike portions 37 which are interconnected by tubular passageways 38 to assist in the uniform distribution of flow of the heat exchange medium used in the panel. Alphanumeric bonded portions 39 also comprise a part of the bonded portions of header 33 and not only assist in the uniform distribution of heat exchange medium but also assist in the correct placement of said panel within an entire heat exchange assembly. Header 33 is bounded by a generally triangular configuration with the most narrow portion of this configuration being spaced at approximately the entire width of the patterned area from said entry portion 35. The wider portion of the triangular area is, were it not for the bonded island-like portions 37, virtually in a direct line for the heat exchange medium entering the panel at entry portion 35. The particular triangular arrangement of each header and the positioning of bonded portions 37 particularly with respect to entry portion 35 facilitates the proportionate division of the incoming stream of heat exchange medium into numerous discrete fluid channels. The provision of these bonded portions serves to maintain each channel under a uniform pressure which helps to overcome the aforenoted problem of pressure drop within the panel. Heat exchange medium leaving the area of header 33 is therefore permitted to flow evenly and rapidly into respective connecting portions 34. The provision of similar bonded portions 37 near exit portion 36 prevents the development of pressure drop as the fluid material reaches the opposite end of panel 10.

Figure 9:
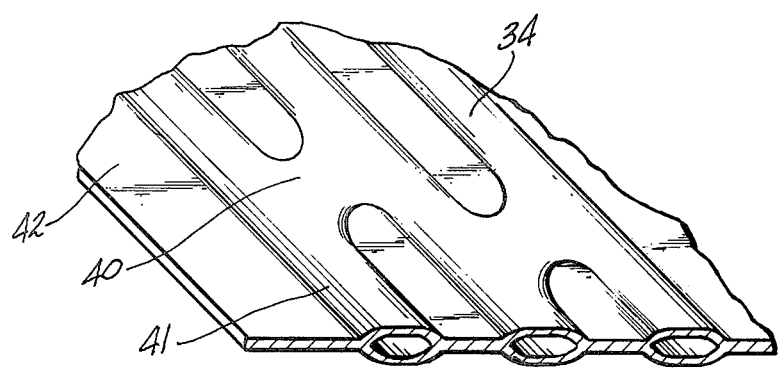
FIG. 9 is a broken perspective view showing the internal tubular passageways of the present invention in section.

The present invention also utilizes connecting portions 40 between the spaced parallel individual connecting portions 34 to provide a uniform flow of heat exchange medium throughout the entire length of the panel. These interconnecting portions of the overall connecting portions 34 are spaced from said header 33 in such a manner so that every other connecting portion is located at one distance from any end point within header 33 and the intervening connecting portions are located at another distance, usually a bit longer than the first distance, from any end point within header 33. This serves to provide a highly uniform distribution of heat exchange medium throughout the connecting tubes 34 since the fluid flows the same distance before entering the interconnecting passageways 40 after leaving header 33. These connecting portions 40 are shown in somewhat enlarged form in FIG. 9.

It is important also to the present invention that the outermost connecting tubes 41 of the spaced tubes 34 be somewhat larger than the tubes either directly adjacent thereto or located more towards the center of the panel. This differentiation is not clearly shown in FIG. 9 since the only usual difference between tubes which usuallu have a width of 0.05", for example, is only approximately 1/16th of an inch. Therefore, tubes utilized in the panel of the present invention which have an inside width of ⅛" will be placed at the edges of the tubing portion of said panel and tubes which have a usual inside width of 7/16th of an inch will be placed starting adjacent to said outer tubes and carrying towards the middle of said panel. The larger tubes 41 of the panel are utilized to provide a greater flow of heat exchange medium through this portion of the panel since the heat radiation effect brought about by fins 42 formed in the panel as made by the present process provides a gain of heat through the end tubes of the tubing design. This gain of heat must be compensated for by putting increased flow of heat exchange medium through said tubes 41 to provide a heat balance throughout said panel.

Figure 10:
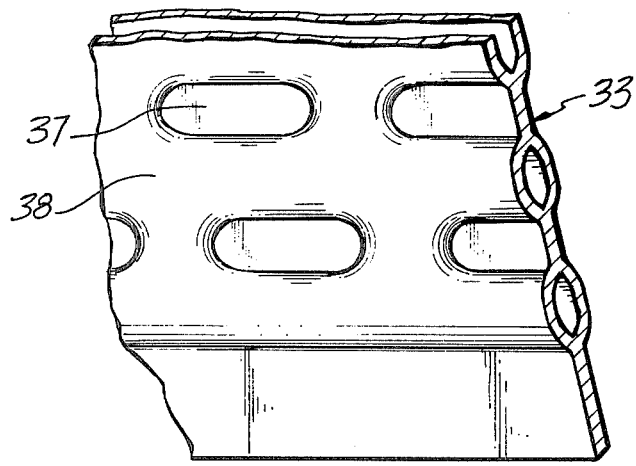
FIG. 10 is a broken perspective view showing the island-like bonded portions and tubular passageways connecting these portions in the header area of the panel.

FIG. 10 shows an enlarged version of a portion of header 33 and indicates more clearly the island-like bonded portions 37 serviced by and connected by tubes 38 which provide a flow of heat exchange medium throughout the header portion of the panel. This provision of island-like portions is also utilized by the alphanumeric indicia shown at 39 in FIG. 8, which are formed in the same manner as the island-like portions shown at 37 in FIGS. 8 and 10. These portions are part of the pattern formed by a stopweld material as shown in FIG. 2 and represent those portions which do not contain the stopweld material. In a preferred embodiment of the present invention, the alphanumeric indicia are utilized to spell and the word "TOP" to indicate which direction the panel should face in a proper installation of said panel in a heat exchange assembly. In addition, the installer of such a panel would know from a mere glance whether or not the proper front surface was facing the sun or whether the back surface was facing the sun simply by seeing whether or not the indicia spelled out the word "TOP" in the proper manner and not in a reversed manner. Therefore, the alphanumeric bonded portions 37 of header 33 act in two important ways of aid in the distribution of heat exchange medium throughout the header and to aid the installer of such a panel to place it in an assembly in the proper manner.

Although this feature is not illustrated in the drawings, the present invention contemplates the provision of connecting portions disposed at an angle of at least 1° with respect to the direction of fluid flow defined in relation to the central axis of the respective exit and entry portions of the panel with respect to FIGS. 5 and 8 as discussed hereinabove. These central axes can be visualized as extending in the direction of connecting portions 34 whereby an intersection with one of said connecting portions provides the definition of the aforenoted angle. This particular feature is disclosed in our co-pending application Ser. No. 632,502, filed Nov. 17, 1975 and now U.S. Pat. No. 4,109,711, the disclosure of which is incorporated herein by reference.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. In a heat exchanger panel for use in a solar energy collector system, said panel comprising a plurality of spaced parallel individual tubular passageways connecting opposed headers defined by numerous island-like bonded portions connected by a plurality of tubular channels passing therebetween, the boundaries of said headers defining a generally triangular shape with at least one of said boundaries being inclined with respect to an edge of said panel, said headers including entry and exit portions to said panel, said entry and exit portions being laterally displaced from the center of said panel to permit a heat exchange medium to flow into said panel and across said headers so that said medium flows through each of the plurality of spaced parallel individual tubular passageways connecting said headers; and said parallel individual tubular passageways being interconnected by further tubular interconnecting portions spaced from said headers the improvement wherein said tubular interconnecting portions are arranged across said panel at an inclination generally corresponding to the inclination of said at least one boundary.

2. A heat exchanger panel according to claim 1, wherein said triangular shape of said headers is generally a right triangle wherein the right angle corner of said right triangle includes said entry and exit portions to said headers.

3. A heat exchanger panel according to claim 2, wherein the longer dimension from said right angle in said triangle forming the header runs the width of said panel.

4. A heat exchanger panel according to claim 2, wherein said spaced parallel individual tubular passageways connect with said header in such a manner that the hypotenuse of said triangle is formed by the interconnections between said parallel tubular passageways and said headers, said hypotenuse forming said at least one inclined boundary.

5. A heat exchanger panel according to claim 4, wherein the taper in the generally triangular shaped header is widest directly opposite said entry and exit portions into said panel.

6. A heat exchanger panel according to claim 1, wherein the spaced parallel individual tubular passageways located immediately adjacent the longitudinal edge portions of said panel have a larger cross sectional area than the other tubular passageways which make up said plurality of spaced parallel tubular passageways.

7. A heat exchanger panel according to claim 1, wherein the portions interconnecting said individual tubular passageways are spaced from said headers in such a manner that the interconnecting portions immediately adjacent the longitudinal boundaries of said spaced parallel passageways are spaced at one distance from said headers and every other interconnecting portion within said passageways are also spaced the same distance from said headers; the remaining interconnecting portions being spaced a second distance differing from said first distance from said headers.

8. A heat exchanger panel according to claim 1, wherein said spaced parallel individual tubular passageways extend across a majority of the longitudinal dimension of said panel.

9. A heat exchanger panel according to claim 1, wherein said spaced parallel individual tubular passageways are disposed at an angle of at least 1° with respect to the direction of fluid flow defined in relation to the central axis of the respective exit and entry portions of the panel.

10. A heat exchanger panel according to claim 1 wherein at least one of such headers includes as part of said bonded portions alphanumeric indicia to define and assist in the correct placement of said panel within said collector system.

11. A heat exchanger panel according to claim 10, wherein said alphanumeric bonded portions within said header are located within said header in such a manner that the correct placement of said portions is in a direction substantially transverse to the direction of said spaced parallel individual tubular passageways.

12. A heat exchanger panel according to claim 10, wherein said island-like bonded portions within said headers, other than said alphanumeric bonded portions, are generally circular or elliptical in shape.

* * * * *